United States Patent [19]

Thompson

[11] Patent Number: 5,179,348

[45] Date of Patent: Jan. 12, 1993

[54] PROGRESSION OF STATES NUMERICALLY CONTROLLED OSCILLATOR

[75] Inventor: Matthew S. Thompson, Walnut, Calif.

[73] Assignee: Interstate electronics Corporation, Anaheim, Calif.

[21] Appl. No.: 748,666

[22] Filed: Aug. 22, 1991

[51] Int. Cl.[5] .................... H03L 7/00; H03K 5/00; H03K 5/13; H03B 19/00

[52] U.S. Cl. ................................. 328/14; 328/155; 307/271; 307/261

[58] Field of Search ................. 328/14, 155; 307/271, 307/261; 364/721

[56] References Cited

U.S. PATENT DOCUMENTS 4,514,696 4/1985 Genrich .............................. 328/14
4,746,880 5/1988 McCune, Jr. ...................... 332/119

OTHER PUBLICATIONS

Joseph Tierney, et al., "A Digital Frequency Synthesizer," *IEEE Transactions on Audio and Electroacoustics*, vol. AU-19, No. 1, Mar. 1971, pp. 48-56.

V. Manassewitch, *Frequency Synthesis Theory and Design*, New York: Wiley, 1987, pp. 37-49.

P. H. Saul, et al., "A Direct Digital Synthesizer with 100-MHz Output Capability," *IEEE Journal of Solid-State Circuits*, vol. 23, No. 3, Jun. 1988, pp. 819-821.

"Paralleling Multiple Direct Digital Synthesizers for Higher Output Frequency Generation," *Application Note AN* 2334-2, Qualcomm, Inc., Jan. 1989, Jul. 1991 Revision.

Burkhard Giebel, et al., "Digitally Controlled Oscillator," *IEEE Journal of Solid State Circuits*, vol. 24, No. 3, Jun. 1989, pp. 640-645.

Stan Goldman, "Phase Locked VCOs for Low Noise UHF Synthesizers," *Microwaves & RF*, vol. 28, No. 8, Aug. 1989, pp. 99-102.

Jack Browne, "DDS Technology Fulfills Promise of Speed and Accuracy," *Microwaves & RF*, vol. 28, No. 9, Sep. 1989, pp. 153-158.

"CFB0600B Adder," LSI Logic, *Compacted Array Series Megafunction Data Book*, Milpitas, SLI Logic, 1990 pp. 122-125.

"32-Bit Resolution CMOS Phase Modulated Numerically Controlled Oscillator Stel-1175," Stanford Telecom, *The DDS Handbook*, Santa Clara Stanford, 1990, pp. 79-90.

Allan Edwin, "Direct-Digital Synthesis Applications," *Microwave Journal*, vol. 33, No. 1, Jan. 1990, pp. 149-151.

(List continued on next page.)

*Primary Examiner*—William L. Sikes
*Assistant Examiner*—Sinh Tran
*Attorney, Agent, or Firm*—Knobbe, Martens, Olson & Bear

[57] ABSTRACT

A numerically controlled oscillator includes a number of N-bit adders that perform parallel addition of a frequency setting word to an accumulated output. A first adder adds the frequency setting word to the accumulated output. A second adder adds a multiple of the frequency setting word to the accumulated output. Additional adders may be included to add other multiples of the frequency setting word to the accumulated output. The sum output of the adder in which the highest multiple of the frequency setting word is added is saved as the new accumulated output. The outputs of all the adders are saved and are mutliplexed out in sequence at a predetermined clock rate as a series of input values to a sine lookup table in a ROM. The outputs from the ROM form the digitized samples of a sine wave at the predetermined clock rate. The frequency setting word is applied to the adders at a reduced clock rate that is lower than the predetermined clock rate so that the adders operate at the reduced clock rate. Thus, the digitized samples of the sine wave are output at the predetermined clock rate that is greater than the clock rate at which the adders are required to operate.

7 Claims, 3 Drawing Sheets

OTHER PUBLICATIONS

Earl W. McCune, Jr., "Digital Communications Using Direct Digital Synthesis," *RF Design*, Jan. 1990, pp. 39-46.

Peter H. Saul, et al., "A High-Speed Direct Frequency Synthesizer," *IEEE Journal of Solid State Circuits*, vol. 25, No. 1, Feb. 1990, pp. 215-219.

"FD2S D Flip-Flop with Clear, SGAN," LSI Logic, 0.7-Micron Array-Based Products Data Book, Milpitas, LSI Logic, Apr. 1990, pp. 2-86.

M. Thompson and J. Luecke, "Configurable Demodulator ASIC for the TDRSS Communication System," *Proceeding of the 1990 IEEE ASIC Seminar and Exhibit*, Sep. 1990, pp. P2-1.1-P2-1.4.

Henry T. Nicholas, III, et al., "A 150-MHz Direct Digital Frequency Synthesizer in 1.25 µm CMOS with −90 dBc Spurious Performance," *1991 IEEE International Custom Integrated Circuits Conference Digest of Technical Papers*, Feb. 1991, pp. 42-43.

Fang Lu, et al., "A 700-MHZ 24-Bit Pipelined Accumulator in 1.2 µM CMOS for Application as a Numerically Controlled Oscillator," *Proceedings of the 1991 IEEE Custom Integrated Circuits Conference*, May 1991, pp. 25.3.1-25.3.4.

"How Do Numerically Controlled Oscillators Work," AN-002, Stanford telecommunications, Inc., 1988 (Three pages).

PROGRESSION OF STATES NUMERICALLY CONTROLLED OSCILLATOR

BACKGROUND OF THE INVENTION

DESCRIPTION OF THE RELATED ART

The process of generating a sine wave signal at a specified frequency is referred to as frequency synthesis. Frequency synthesis is an important component of many systems, including phased locked loop (PLL) systems. It can be done in analog fashion using a voltage controlled oscillator (VCO) or digitally with a numerically controlled oscillator (NCO). A VCO generates an analog sine wave at a frequency which is proportional to an input voltage level. An NCO outputs a digital sine wave at a frequency specified by an input digital word, and this process is known as direct digital synthesis or DDS. A D/A converter can be used to convert the digital sine wave to an analog signal if needed.

In the past, analog frequency synthesis systems were preferred to DDS systems because of their high output frequency capabilities and spectral purity. However, they also have exhibited severe limitations. For instance, they operate within a very small frequency range (typically less than one octave), they have a high sensitivity to temperature changes and aging, and they have long frequency tuning times (1 msec). Digital frequency synthesis techniques have solved these problems, but in the past have been expensive to implement. With the increasingly large die sizes used in ASIC technology, the cost of implementing customized digital frequency synthesizers has been dramatically reduced and are now routinely incorporated into larger system designs on ASIC chips. The advantages of DDS systems include fast switching times, smooth frequency transitions, and fine frequency steps.

The basic structure of an NCO comprises an N-bit accumulator register and a sine lookup table stored in ROM. The NCO uses the value in the accumulator register as an index into the lookup table. The lookup table has $2^N$ entries corresponding to the $2^N$ possible values that can be stored in the accumulator register, and the nth value in the table is the sine of the nth multiple of $2\pi/2^N$ radians. In other words, the table represents one full cycle of a sine wave divided into $2^N$ equally spaced values.

During operation, the value in the accumulator register is incremented at the accumulator clock rate $f_c$. At the same rate, the NCO continuously outputs the lookup table entry corresponding to the value in the accumulator register. If the increment value is unity, then the accumulator runs through every value from 0 to $2^N-1$. This causes the NCO to reference every entry in the lookup table in order and output the sines of $2^N$ angles between 0 and $2\pi$, after which the accumulator overflows and starts again at the bottom of the table. Since there are $2^N$ entries in the table, the output frequency $f_o$ of the NCO is equal to $f_c/2^N$.

The output frequency can be varied by changing the amount the accumulator is incremented each clock cycle. If the increment value is denoted by R, the output frequency can then be calculated by the equation: $f_o=R*(f_c/2^N)$. If R is increased, the frequency increases because the NCO skips entries in the lookup table and thereby runs through a full cycle of the sine wave more quickly. Thus, R is referred to as the frequency setting word. Because less table entries are accessed as R increases, an aliased frequency of $f_c-f_o$ appears at the output when using a D/A converter to reconstruct the sine signal. This frequency must be filtered out using a low pass filter. Because of the cutoff frequency imposed by the filter, the maximum output frequency of the NCO is thus usually reduced to about 40% of $f_c$.

Because the maximum output frequency is limited by the accumulator clock speed $f_c$, NCO's using a single accumulator register cannot reach the high frequencies achieved by analog VCO's. The maximum clock rate $f_c$ of the accumulator is determined by the time it takes to update the state of the accumulator register. This depends on the speed of the N-bit adder including setup and hold times for the surrounding registers. Using one micron CMOS technology under worst operating conditions, a typical 16-bit NCO with a single accumulator can reach a maximum accumulator speed of only 65 MHz.

The most current solution to this problem is to use a pipelined structure for the accumulator. Instead of adding the frequency setting word R to the accumulator with an N-bit adder, the addition is performed one bit at a time by creating a pipeline with faster one-bit adders at each stage. This can increase the maximum frequency of the NCO by a factor near but usually less than N. Examples of pipelined architectures for NCO's can be found for example in the paper entitled "A 700-MHz 24-Bit Pipelined Accumulator in 1.2 μm CMOS for Application as a Numerically Controlled Oscillator" in *Proceedings of the 1991 IEEE Custom Integrated Circuits Conference* and also in the paper entitled "A 150-MHz Direct Digital Frequency Synthesizer in 1.25 μm CMOS with −90 dBc Spurious Performance" in 1991 *IEEE International Custom Integrated Circuits Conference*.

The disadvantage of using a pipelined accumulator is that it introduces a large latency into the system. Latency is defined as the number of clock cycles it takes for the output to respond to a change in the frequency setting word. Pipelined DDS systems have high latencies because it takes longer to increment the accumulator one bit at a time than all at once. The pipeline introduces a latency equal to the length of the pipeline as a tradeoff for speed. Examples of current pipelined systems include an NCO with a maximum clock frequency of 700 Mhz, but having a 55 clock cycle latency and an NCO with only a 13 cycle latency, but with a correspondingly low maximum clock rate of 150 MHz.

In some situations, latency is not a critical factor when using an NCO, but in many applications it is. For instance, if we were implementing a frequency tracking system using a phased locked loop, any delays in the response time of the NCO would affect response time of the system to changes in the incoming signal. In short, the latency determines the maximum frequency in the input signal to which the system will respond.

SUMMARY OF THE INVENTION

Instead of using a pipeline, the present invention achieves both low latency and high speed output by introducing parallelism into the accumulator design. This is done by determining the next k accumulator states simultaneously on k parallel channels and then multiplexing them at high speed onto a single output channel. The assumption must be made that the frequency setting word R will remain constant over the next k states, allowing the calculation of these states in advance. For small values of k, this assumption does not significantly affect the operation of the NCO.

One aspect of the present invention is a numerically controlled oscillator that generates output samples of a digitally synthesized signal having a fundamental frequency controlled by a digital input word. The oscillator comprises an input register that receives the digital input word at a first accumulator data rate and provides the digital word as an increment output value. A first adder adds the increment output value to a feedback signal to provide a first sum output signal. A second adder adds a multiple of the increment output value and the feedback signal to provide a second sum output signal. A first register latches the first sum output signal at the first accumulator data rate to provide a first latched sum signal. A second register latches the second sum output signal at the first rate to provide a second latched sum signal. The second latched sum signal corresponds to the feedback signal. A multiplexer receives the first and second latched sum signals from the first and second registers and provides the first and second latched sum signals as sequential outputs at a second accumulator data rate which is a multiple of the first accumulator data rate. The sequential outputs correspond to the radian angle of the synthesized digital signal.

DETAILED DESCRIPTION OF THE PREFERRED EMBODIMENT

Figure 1:
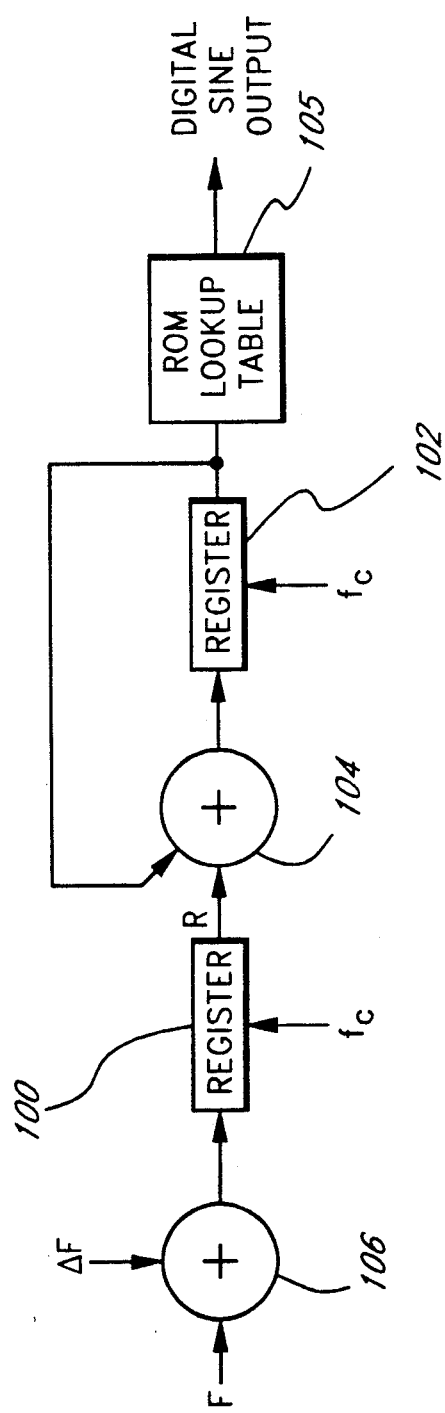
FIG. 1 is a schematic diagram of a one-channel numerically controlled oscillator circuit as currently exemplified in the art.

The basic structure of a single channel NCO is shown in FIG. 1. It comprises a frequency set register 100, an accumulator register 102, an N-bit adder 104, and a read only memory (ROM) 105 having a sine lookup table which contains digital values for one cycle of a sine wave signal. (For convenience, the ROM 105 will be referred to hereinafter as the ROM lookup table 105.)

A frequency setting word, denoted by R, is loaded into the register 100 every clock cycle at the clock rate $f_c$. The value of R is often obtained as the result of adding a frequency adjust word $\Delta F$ to a fixed ideal frequency F using a pre-adder 106. At each clock cycle, the value R in the frequency set register 100 is added to the current value in the accumulator register 102 and the sum is stored (i.e., latched) back into the accumulator register 102. The value in the accumulator register 102 corresponds to the radian angle of the signal to be synthesized and is used as an address to fetch the corresponding table entry in the ROM lookup table 105. If the accumulator value is M, the output of the ROM lookup table 105 is the sine of the angle $2\pi M/2^N$, where N is the number of bits in registers 100 and 102. The digital sine values may be applied to a D/A converter (not shown) to produce an analog signal.

As discussed above, the rate at which the value in the accumulator can change is limited by the speed of the adder 104. The adder speed can be increased by decreasing the number of bits N of the adder 104. However, reducing the number of bits dramatically reduces the frequency resolution, as one less bit cuts the resolution in half. Thus, a need exists for a high speed accumulator that does not sacrifice frequency resolution.

Figure 2:
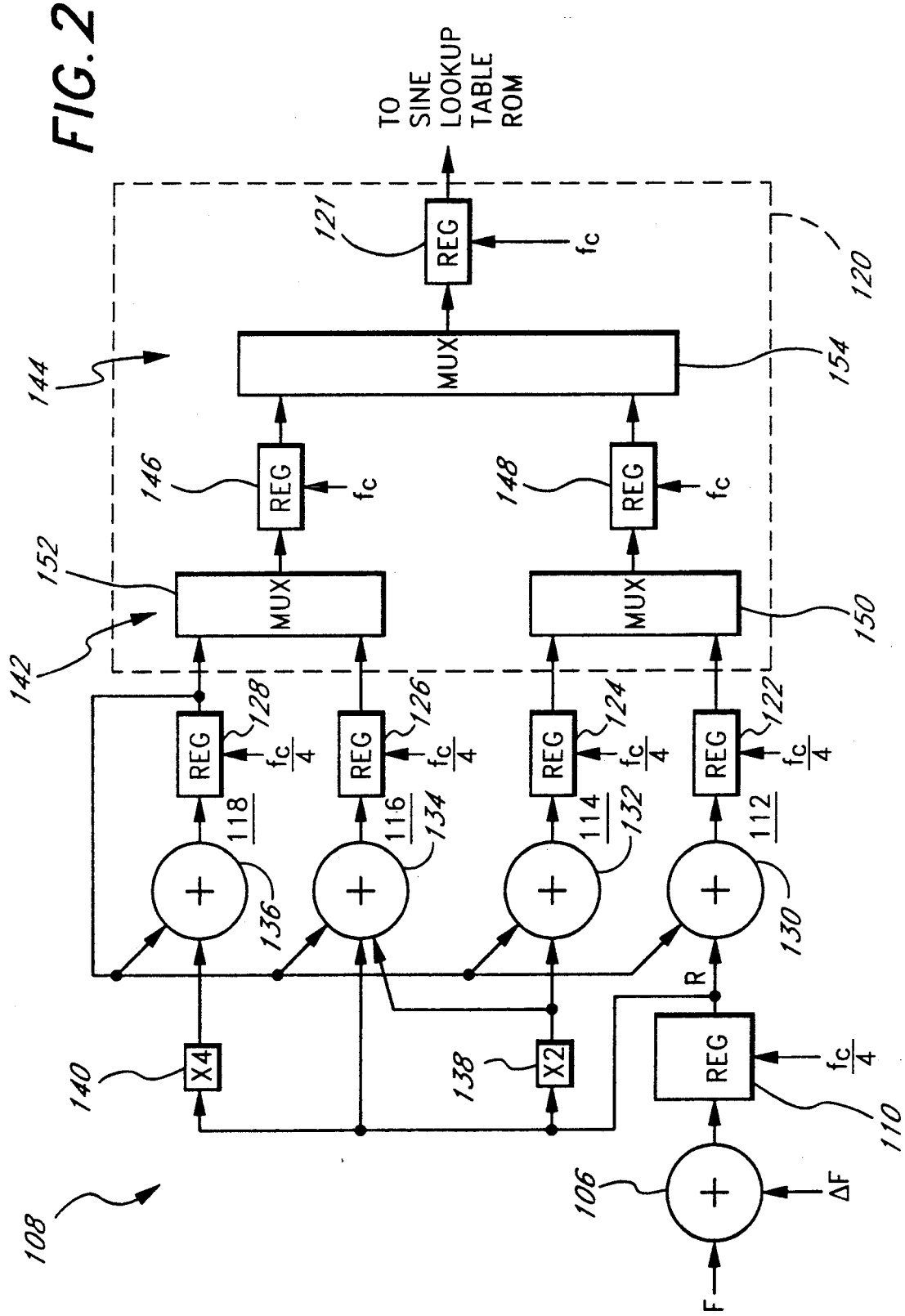
FIG. 2 is a schematic diagram of one embodiment of the present invention.

FIG. 2 represents a four-channel embodiment of a numerically controlled oscillator or NCO 108 in accordance with the present invention. Other embodiments may comprise any number of channels greater than one. The NCO 108 comprises the pre-adder 106, an N-bit frequency set register (or latch) 110, four N-bit channels 112, 114, 116, and 118, a recombining circuit 120, and an output register (or latch) 121. Each channel comprises an N-bit state register (or latch) 122, 124, 126, 128 and an N-bit adder 130, 132, 134, 136 respectively. The second channel 114 further comprises a one-bit left shift unit 138 and the fourth channel further comprises a two-bit left shift unit 140. The left shift unit 138 provides the effect of multiplication by two and is thus illustrated as a $\times 2$ multiplier. Similarly, the left shift unit 140 provides the effect of a multiplication by four and is thus illustrated as a $\times 4$ multiplier. The shift or $\times 2$ multiplication, for example, is easily implemented by connecting the least significant output from the register 110 to the next least significant input bit of the adder 132.

The adder 134 of the third channel 116 is a three-input (or three-port) adder. The other three adders 130, 132, and 136 are two-input (or two-port) adders. The recombining circuit 120 comprises two recombining levels 142, 144 comprising 2:1 multiplexers (MUX's) with buffer registers 146, 148 between the two levels. The first recombining level 142 comprises two MUX's 150 and 152 which can switch input channels at the clock rate $f_c$. The MUX 150 receives the outputs of channels 1 and 2 as inputs and the MUX 152 receives the outputs of channels 3 and 4 as inputs. The second recombining level 144 comprises a single MUX 154 which switches between the outputs of the MUX 150 and the MUX 152 at half the clock rate or $f_c/2$.

Continuing to refer to FIG. 2, the frequency setting word R is generated by the pre-adder 106 as discussed above and is loaded into the frequency set register 110 every four clock cycles (i.e., at a rate of $f_c/4$). The rate of loading the frequency set register 110 is selected so that the value of R remains constant during as many clock cycles as there are NCO channels (e.g., four in FIG. 2). In this way, the values to be added to the most recent state of the accumulator are simply multiples of R. To be more specific, let $M_0$ represent the value of the most recent address into the lookup table output by the accumulator, and let $M_1$, $M_2$, $M_3$, and $M_4$ be the next four addresses to be output by channels 1, 2, 3, and 4 respectively. $M_0$ is located in the fourth or last state register 128 and R is located in the frequency set register 110. The new addresses are obtained by the following equations:

$$M_1 = M_0 + R$$

$$M_2 = M_0 + 2R$$

$$M_3 = M_0 + 3R$$

$$M_4 = M_0 + 4R$$

These values are calculated at the same time to provide the extra speed and stored in the four state registers 122, 124, 126, and 128. Once they have been bused out by the recombining circuit 120, M$_4$ becomes M$_0$ and the process is repeated.

The additions are performed as follows. In the first channel 112, the adder 130 simply adds R and M$_0$ and stores the result (M$_0$+R) in the first state register 122. In the second channel 114, R undergoes a one-bit left shift by the shift unit 138, which doubles it to 2R, and is then added to M$_0$ by the adder 132. The result (M$_0$+2R) is stored in the second state register 124. In the third channel 116, 3R is added to M$_0$ in the three-input adder 134 by adding both R and 2R from the first two channels 112 and 114. The result (M$_0$+3R) is stored in the third state register 126. The fourth channel 118 performs a 2-bit left shift on R with the shift unit 140, yielding 4R, before adding it to M$_0$ in the fourth adder 136. This result (M$_0$+4R) is stored in the fourth state register 128. Since the state registers 122 through 128 are intended to overflow, the carry bits from the additions can be ignored.

The frequency set register 110 is read only every fourth (Nth) clock cycle. This means that the maximum update rate of the NCO 108 is reduced by a factor of four (N) over a single channel NCO as shown in FIG. 1, but this is not a significant adjustment in most cases. After the additions are completed, the values in the state registers 122 through 128 are then available for the next four clock cycles, during which they are multiplexed to a single output line by the recombining circuit 120. In the first recombination level 142, the channels are multiplexed at the clock rate f$_c$ in order from the first channel 112 to the last channel 118 by the MUX's 150 and 152. The register values are transferred and stored in the buffer registers 146 and 148 during their respective clock cycles. The second recombination level 144, comprising the MUX 154 operating at f$_c$/2, takes the outputs of the first recombination level 142 from the buffer registers 146 and 148 and outputs the four values in sequence to the output register 121. This tiered structure of 2:1 MUX's is used because of the high speed that can be achieved as compared to a single, slower 4:1 MUX. The configuration can be easily extended to 8 channels with a three level recombining circuit. In general, if the NCO had $2^N$ channels, the recombining circuit will have N recombination levels.

An alternate configuration for the recombining circuit 120 would involve connecting the first 2:1 MUX 150 to channels 1 and 3 and the second MUX 152 to channels 2 and 4. The MUX's would now only have to operate at f$_c$/2 rather than at f$_c$. The MUX 154 in the second level would then have to operate faster than before at the clock rate f$_c$. This design is desirable since it reduces the number of higher speed MUX's, which are more expensive. This configuration can also be extended to NCO's with 8 or more channels.

As the values are stored in the output register 121, they are used as index addresses into the sine lookup table 105 (FIG. 1) by which output values are selected and used to synthesize the sine wave signal, as described above. The maximum accumulator speed f$_c$ is determined by the NCO's slowest component, that is, the component with the longest propagation delay. All propagation delays are calculated here under worst operating conditions (VDD=4.75 Volts, junction temperature=70° C.) for 1 μm technology and account for setup and hold times of the surrounding storage registers. In one particular embodiment, the three-input adder 134 has a propagation delay time of 16.86 nanoseconds. Since four accumulator states are calculated during every addition stage, this provides an available state every 4.21 nanoseconds. The MUX's 150 and 152 in the recombine circuit have a propagation delay of 3.74 nanoseconds, thus, the three-input adder 134 with its slower propagation time limits the maximum clock frequency to 237 MHz.

Figure 3:
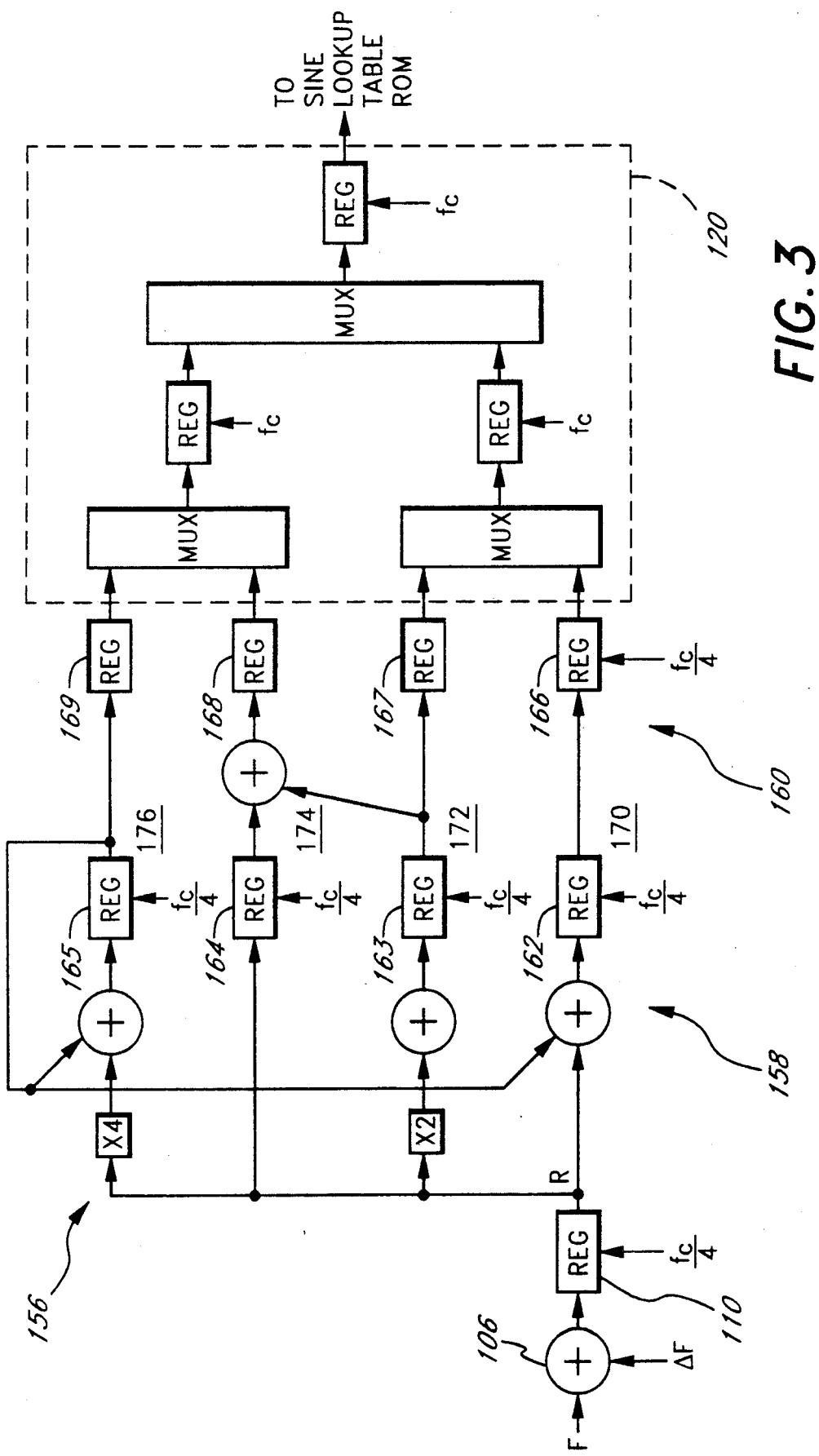
FIG. 3 is a schematic diagram of an alternate embodiment of the present invention.

A second embodiment of a four channel NCO 156 is shown in FIG. 3. This embodiment provides an increased accumulator speed with a tradeoff of an increase in latency. The NCO 156 again has four channels 170, 172, 174, and 176, but the calculation of states on each channel is broken up into two stages 158 and 160. In the first stage 158, the value in the last state register 165 is added to multiples of R in the frequency set register 110 for channels 1, 2, and 4 just as in the first described embodiment. In channel 3, however, the three-input adder 134 is not present. The value of R is instead simply stored in the state register 164. In the second stage 160, the values in the first stage registers 162, 163 and 165 for channels 1, 2, and 4 are simply transferred to the second stage registers 166, 167, and 169. In the second stage of the third channel 174, the value of R in the first stage register 164 of the third channel 174 is added to the contents of the first stage register 163 of the second channel 172. In this way, the addition is performed with only two-input adders in a two stage pipeline. Since the two-input adders have a propagation delay of only 14.75 nanoseconds, a new state is available every 3.69 nanoseconds. Now the 2:1 MUX's in the recombination circuit 120 are the slowest components of the NCO. Using a 1.0 μm LSI Logic gate array MUX, the maximum clock frequency increases to 267 MHz. Standard CMOS output buffers may experience problems transferring data off the chip at this rate. To avoid these buffer problems, the four values in the state registers may be sent directly off the chip at 68 MHz before the recombination stage. The recombining circuit 120 can then be implemented external to the ASIC chip and external high speed logic can then be used to recombine the signal at 267 MHz.

The extra pipeline stage in the embodiment of FIG. 3 introduces more latency into the NCO. The embodiment shown in FIG. 2 has a latency of 5 clock cycles. The extra stage adds 4 more clock cycles, producing a latency of 9 cycles. This is still a great improvement over the typical 17 cycle latency for a pipelined, 16-bit NCO.

It is possible to further increase the speed of the NCO by increasing the number of channels, but this reduces the update rate and also increases costs due to the extra hardware involved. Similarly, the number of channels can be reduced to cut costs when very high clock speeds are not needed. For example, if a maximum clock rate of only 130 MHz is needed, a two-channel NCO can be used which is much less expensive to implement than its four-channel counterpart.

What is claimed is:

1. A numerically controlled oscillator that generates output samples of a digitally synthesized signal having a fundamental frequency controlled by a digital input word, said oscillator comprising:

an input register that receives said digital input word at a first accumulator data rate and provides said digital word as an increment output value;

a first adder that adds said increment output value to a feedback signal to provide a first sum output signal;

a second adder that adds a multiple of said increment output value derived from said increment output value and said feedback signal to provide a second sum output signal;

a first register that latches said first sum output signal at said first accumulator data rate to provide a first latched sum signal;

a second register that latches said second sum output signal at said first accumulator data rate to provide a second latched sum signal, said second latched sum signal corresponding to said feedback signal; and a multiplexer that receives said first and second latched sum signals from said first and second registers and provides the first and second latched sum signals as sequential outputs at a second accumulator data rate which is a multiple of said first accumulator data rate, said sequential outputs corresponding to the radian angle of said synthesized digital signal.

2. A numerically controlled oscillator that outputs a periodic sequence of digital output values to an output channel at an accumulator clock rate, said periodic sequence having a potentially variable fundamental frequency which is controlled by a digital input word stored in an input register and continuously updated at an update clock rate, said oscillator comprising first and second parallel channels, each channel connected to receive said stored digital input word from said input register, said first and second parallel channels simultaneously and periodically outputting first and second consecutive digital values in said periodic sequence of digital output values, said first and second parallel channels each further connected to receive said second consecutive digital value as a feedback signal, said first channel adding said second consecutive digital value to said stored digital input word to generate a new first consecutive digital value, said second channel adding said second consecutive digital value to a binary multiple of said stored digital input word to generate a new second consecutive digital value, said oscillator further comprising a recombining circuit connected to receive said first and second consecutive digital values from said first and second parallel channels, respectively, said recombining circuits further being coupled to transfer said first and second consecutive digital values in proper sequence to said output channel.

3. The oscillator of claim 2, wherein said first and second parallel channels comprise first and second adders which add said feedback signal to first and second binary multiples of said input digital word to simultaneously compute said first and second consecutive digital values, said first and second parallel channels further comprising first and second storage registers which latch the output of said first and second adders to provide first and second latched sum signals, said second latched sum signal corresponding to said feedback signal.

4. The oscillator of claim 2, wherein said oscillator further comprises an additional number of parallel channels which simultaneously compute a corresponding additional number of consecutive digital values, said additional values being transferred by said recombining circuit as part of said periodic sequence of digital output values.

5. The oscillator of claim 2, wherein said periodic sequence of digital output values comprises a periodic sequence of index values, said oscillator further comprising a lookup table which receives said periodic sequence of index values on said output channel and converts said sequence of index values to a second sequence of digital output values.

6. The oscillator of claim 3, wherein said second parallel channel further comprises a left shift unit which outputs a shifted digital signal equal to said second binary multiples of said digital input word.

7. The oscillator of claim 2, wherein said recombining unit comprises at least one multiplexer.

* * * * *